United States Patent [19]

Moser

[11] Patent Number: 4,604,821
[45] Date of Patent: Aug. 12, 1986

[54] FLY FISHING JUNCTION LEADER

[76] Inventor: Roman Moser, Kuferzeile 19, 4810 Gmunden, Austria

[21] Appl. No.: 531,072

[22] Filed: Sep. 12, 1983

[51] Int. Cl.⁴ .............................................. A01K 91/00
[52] U.S. Cl. ......................................... 43/44.98; 87/8; 87/9; 87/11
[58] Field of Search .................. 43/44.98; 87/8, 9, 11; 428/399

[56] References Cited

U.S. PATENT DOCUMENTS

| 2,207,157 | 7/1940 | Neville | 428/399 |
| 2,370,112 | 2/1945 | Truitt | 428/399 |
| 2,407,929 | 9/1946 | Jeckel | 87/11 |
| 2,933,798 | 4/1960 | Miller | 43/44.98 |
| 3,758,479 | 9/1973 | Martuch | 43/44.98 |
| 3,864,865 | 2/1975 | Swisher | 43/44.98 |
| 3,914,480 | 10/1975 | Lang | 43/44.98 |
| 4,155,973 | 5/1979 | Klein | 43/44.98 |
| 4,550,938 | 11/1985 | Nakanishi | 43/44.98 |

Primary Examiner—Nicholas P. Godici
Assistant Examiner—Christopher L. McKee
Attorney, Agent, or Firm—Kokjer, Kircher, Bradley, Wharton, Bowman & Johnson

[57] ABSTRACT

A flexible elongated tubular attachment to be interposed between the fly fishing line and the leader line to eliminate the necessity of knot tying the leader to the fly fishing line.

4 Claims, 9 Drawing Figures

FLY FISHING JUNCTION LEADER

FIELD OF INVENTION

The invention pertains to the field of fly fishing. i.e., the use of artificial flies as the bait used for fishing.

KNOWN PRIOR ART

Applicant is familar with the following U.S. patents:

| TRIGG | 3,883,102 |
| HOADLEY | 3,999,253 |

BACKGROUND OF THE INVENTION

The art of fly fishing has appealed to fishermen for many many years. However several problems have long lingered in the hearts and minds of the avid fishermen. First, is the matter of easily connecting the fly fishing line to the leader line; and the second is be able to cast the leader line with the fly far from his location.

As to the first, many fishermen suffer arthritis, or they are not familiar with tying small knots or doing tiny fingerwork which makes knot tying difficult, and even if they do not have arthritis, knot tying itself is time consuming and requires concentration. This is good fishing time going to waste. In addition, the corollary is that when one wants to change leaders, he must cut off the leader already attached to the line; another time consuming project. Furthermore, the improved leader of this invention can be cast out without curling into concentric circles and it also works as a shock absorber, thus achieving consistent lengthy and precise casts to the target.

Both of these problems have been solved by the product of this invention. The invention herein includes an easily formed junction means for securing fly line to leaer line, and it includes a leader line which is easy to cast out fully without entangling of same.

It is an object therefore of this invention to provide a quick and easily made junction between fly line and leader.

It is another object to provide a line junction that eliminates the need for knot tieing.

It is yet another object to provide a dry fly leader having a trio of specific filaments wound in a novel manner.

A yet further object is to provide a mode whereby one can change the twisted dry fly leader very fast and easily on the stream side with another such as a wet fly leader or a heavier leader as desired.

A still further object is to provide a leader that can be cast to the full potential of the line for distance.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of which will be indicated in the claims.

For a fuller understanding of the nature and objects of the invention, reference should be had to the following detailed description taken in conjunction with the accompanying drawings.

SUMMARY OF THE INVENTION

The instant invention pertains to a junction leader to attach a fly fishing line to a leader line for use in fly fishing. The joinder means is a tubular member into which the fly fishing line is inserted and then a glue joint is formed in situ. The tube is formed by winding a plurality of filaments around mandrel to form a tubular braid. The leader line attached to the other end of the junction means at the factory is formed by braiding a trio of different monofilaments together. Taken together the novel leader line and the novel joiner means are designated as the novel junction leader. The junction leader can be prepared as a wet fly leader or a dry fly leader.

DESCRIPTION OF THE PREFERRED EMBODIMENT

Figure 1:
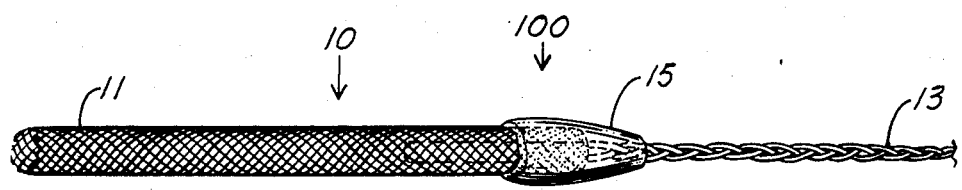
FIG. 1 is a perspective view of the device of this invention.
Figure 3:
FIG. 3 is a perspective view of one portion of this invention.
Figure 4:
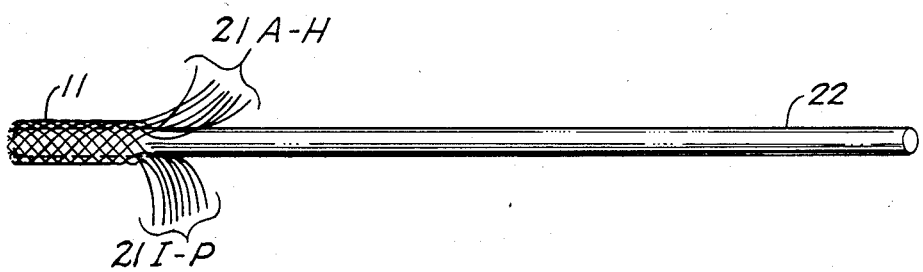
FIG. 4 is a diagrammatic simplified view illustrating the manufacture of a portion of this invention.

In FIG. 1 there is shown in perspective the junction leader 100 comprised of the joinder means 10 attached to leader line 13 by glue joint 15. The junction leader of this invention 100 first includes the joiner means 10. Said joinder means 10 shown in pespective by itself in FIG. 3 comprises an elongated tubular braided body 11. Consisting of a large plurality of braided strands. The plurality can comprise anywhere from ten (10) to twenty (20) monofilaments. In FIG. 4, to be discussed below, sixteen (16) of these are seen and are designated monofilaments 21A–H and 21I–P inclusive. This tubular member includes open ends 17A and 17B. See FIG. 3.

As previously mentioned, tubular member 11 is formed by braiding a plurality of monofilaments within the range of 0.08 to 0.24 mm thick around a mandril to form a braided tube. Typically the monofilaments are nylon or polyester, the latter being water repellent and lighter than water for surface fishing; the former being water absorptive for bottom fishing. Farben, Hoecht and Boyer Lererhuren manufacture an excellent product for this use called polyanide. In my preferred version, I use sixteen (16) strands at 0.14 mm nylon monofilament. These monofilaments are readily available in the marketplace in both the U.S.A. and Europe. Braiding machines are also readily available from various sources. The glue company which makes the glue that is preferred is Buhnen Company of Brehman, West Germany.

As to the mandril, I have found that excellent results are obtained when the braid is formed over a 1 mm monofilament of nylon which after removal from the braid leaves a tubular member. Of course a copper wire or brass wire can be used but are not preferred.

Figure 2:
FIG. 2 is a left elevational view thereof.

An end view of the tubular member 11 is seen in FIG. 2, which shows the braid and the bore.

This tube resembles the Chinese finger trap in that when elongated under force it constricts tightening upon any item inserted therein. More on this point below.

The reason that the non-metallic mandril is preferred is that the product is shipped with the mandril intact. The maintenance of the mandril in the tubular member prevents fisherpersons from crushing the product in their pocket or tacklebox, thereby losing the bore. Time of use removal prevents this. Plus, the plastic is easier to use and will not scratch hands, eyes or body as would a thin wire.

The second part of this invention is the novel leader line 13. It is formed by braiding together the three (3) individual monofilaments 23,25, 27, two tapered section of different length and one level monofilament, shown in FIG. 5. The first monofilament 23 is a tapered full length line, while the second 25 is a straight or level line of equal cross section throughout the length of the line; while the third 27 is a tapered half length line. It is similar in configuration to the tapered full length line but has been shortened, though a greater tapered smaller unit may be employed if desired. Typically such lines are seven and one-half (7½) to nine and one-half (9½) feet (2.28 To 2.89 meters), about 1.70 meters and about 1.30 meters long respectively. These are braided together with no mandril to give a long, relatively thick butt section at one end of the leader line. The machinery to do such braiding is known to the art. Reference is made to FIG. 1 which depicts the improved, braided leader of this invention. Here, too, the polymeric makeup can differ according to the needs of the fisherman for buoyancy. The butt end 13B is seen to be the thicker end, because the braiding is done around the long tapered line, such as to leave a portion thereof unbraided, since the supply of level line and short tapered line will exhaust in the braided process.

Figure 5:
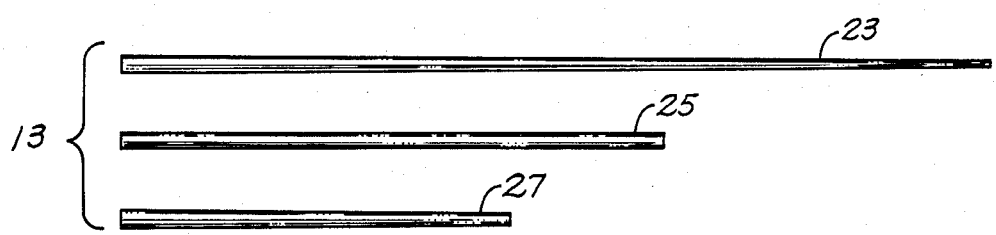
FIG. 5 is an elevational view of the three components, prior to their unification, that form a part of this invention.
Figure 8:
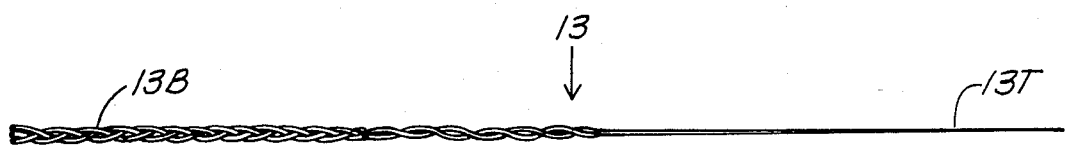
FIG. 8 is a perspective view of the dry fly leader line of this invention.

As shown in FIG. 5, there are three (3) component filaments that go into the making of the improved leader of this invention. It has been found that by having a thicker proximal or butt end for attachment to the joinder means that a secure junction can be achieved. While on the other hand, the thin line tiped section at the distal end or tip is what is desired for attachment to the fly and to get long, soft dropping of the fly with an easy landing. See FIG. 8

Figure 9:
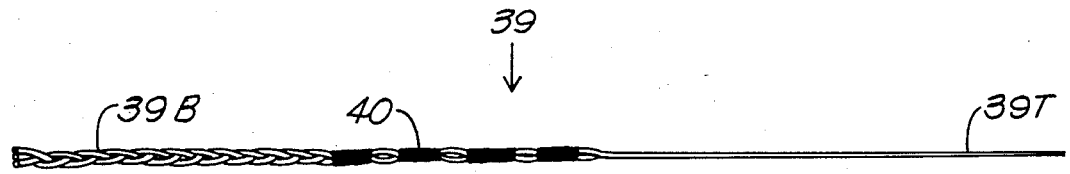
FIG. 9 is a perspective view of the improved wet fly leader of this invention.

The leader described above is referred to as the improved dry fly leader portion of the invention. In addition, I can provide an improved wet fly portion, intended for bottom fishing, as shown in FIG. 9.

The wet fly leader 39 is formed in like manner as dry fly leader 13. It has a butt section 39B and a top section 39T, which is only the long tappered line. After the braiding is completed, I prepare a mixture of commercial epoxy and lead filings. The mixture is dabbed on and spaced along the bottom portion of the three (3) braided lines and allowed to dry to form heavy zones 40 which will cause the leader line to sink. Here a nine and one-half (9½) foot (2.89 meter) total leader with a braided portion of 1.5 meters is preferred.

Figure 6:
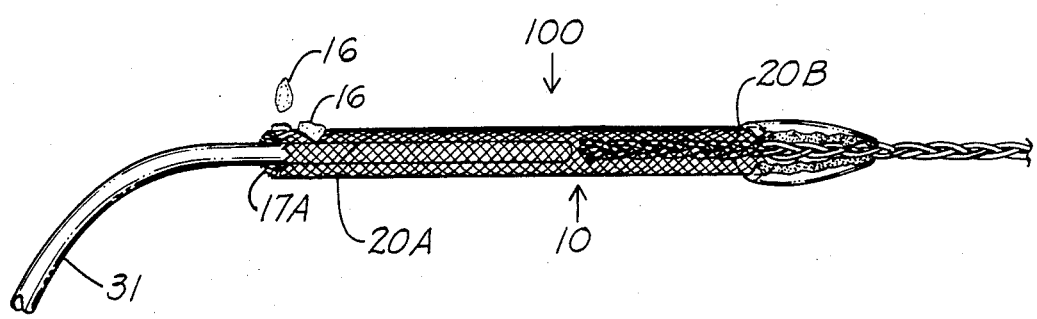
FIG. 6 is an elevational view illustrating the method of joining the fly line to the leader line according to this invention.

At the factory the braided leader 13 is inserted into one end, be it 17A or 17B about one-third (⅓) to one-half (½) the length of the tubular member 10. Drops of glue, similar to 16 as shown in FIG. 6 are dropped on from a hot batch of heated thermal glue. One way to do this is to use a glue gun such as made by United Shoe Machinery of Boston, Mass. among others. You can also use some other flexible glues such as an epoxy glue but those have a time consuming drying time. These, however, have a later time detrimental side effect in that the glue bond is difficult to break should it become necessary to replace the leader portion of the junction leader. Device 100, the junction leader is completed by smoothing the glue around the connection to form a tapered joint as seen in FIGS. 1 and 6 and designated 15. Device 100 is now ready for use.

Figure 7:
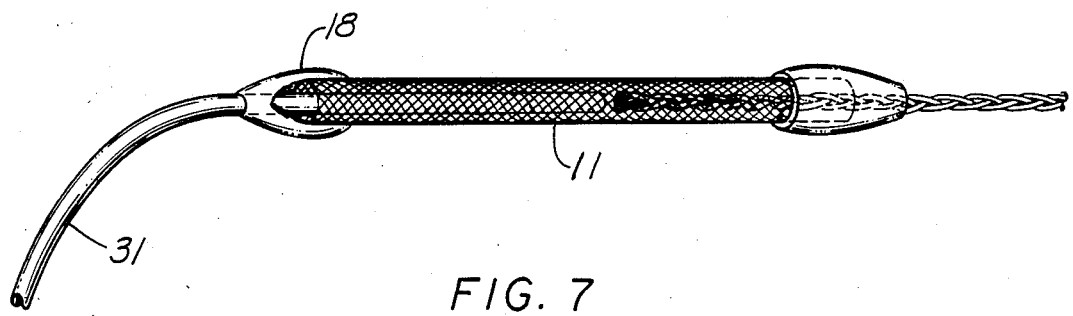
FIG. 7 is a perspective view showing the leader attached to the fly line.

The consumer will utilize device 100, the junction leader, by first snipping the end of his or her fly line 31, if a smooth end is not already present, and inserting the line 31 about one-third (⅓) to one-half (½) the distance up the tube opening 19. The leader end 20B of device 100 is stretched while holding onto line end 20A, per FIG. 6, in order to constrict the tube 10 around the fly line 31. This is the analogy to the Chinese finger trap, in that pulling makes the encircling of the end 17A tighter around line 31. Glue is applied as by drops 16 in FIG. 6 to form a joint 18 as seen in FIG. 7.

The mode suggested by and facilitated in the packaging of applicant's assignee is to heat or stick of thermal glue as by a match or lighter until it becomes translucent. Wait until smoke has gone. Apply same by dabbing it around the tip at the tube opening 17A and on the line 31 and the end 20A. Wait four (4) seconds and roll the glue under finger pressure to set it. Then rub the now applied glue to a flat and smooth surface to form a tight, air free joint resembling the factory formed joint 15. It is important to wait for the smoke to clear, as this gives the glue a chance to cool slightly and it remains plastic, such that burning of the fly fishing line is avoiding.

"Crazy Glue," which is cyanoacrylate is not recommended as it is too brittle when hardened. Also since air is present on the surface drying does not take place in the recommended manner.

Another advantage to using thermal glue is that when the fisherperson wants to change leaders such as from top fishing to a nymph or bottom fishing line that the joint 18 can be readily peeled away by one's fingernail.

Thermal glues are readily available in the marketplace in the U.S.A. and Europe.

It is seen therefore that I have provided a novel leader line which is joined to a novel joinder means in combination form a novel junction leader for use with a fisherperson's fly line. This novel combination and the subcombinations are easy to use and will provide many hours of fishing pleasure to the user.

By utilizing a contrictable tubular configuration I am able to obtain a tight fit around both leader line and fly line and eliminate the tying of the lines together.

Since certain changes may be made in the above product and process without departing from the scope of the invention herein involved, it is intended that all matter contained in the above description or shown in the accompanying drawings shall be interpreted as illustrative and not in a limiting sense.

I claim

1. A junction leader for a fly line comprising:
   a hollow braided tube formed by a plurality of braided filaments, said tube having open opposite ends one of which is large enough to receive the fly line therein and said tube constricting upon elongation to permit constriction of the tube on the fly line inserted into said one end thereof; and
   a leader line tapering from a butt end thereof to a distal end adapted for attachment to a fly, said butt end being received in the end of the tube opposite said one end and being glued in place therein, said leader line comprising:
   a first monofilament tapering from said butt end toward said distal end;
   a second monofilament shorter than said first monofilament and substantially uniform in cross section; and
   a third monofilament shorter than said first monofilament and tapering from said butt end toward said distal end said monofilaments all being braided together to form the leader line.

2. In a fly fishing line, the combination of:
   a plurality of filaments braided together to form a hollow tube which constricts upon elongation, said tube having open first and second ends;
   a leader line having a butt end fitted in said first end of the tube and a distal end adapted for attachment to a fly, said butt end being glued in said first end of the tube, said leader line comprising:
   a first monofilament tapering from said butt end toward said distal end;
   a second monofilament shorter than said first monofilament and substantially uniform in cross section; and
   a third monofilament shorter than said first monofilament and tapering from said butt end toward said distal end, said monofilaments all being braided together to form the leader line; and
   a fly line extending into said second end of the tube, said tube being stretched and thereby constricted on said fly lone and being glued thereto.

3. A method of joining a fly line to a leader line, comprising the steps of :
   forming a hollow braided tube which has open opposite ends and which constricts upon elongation;
   forming a leader line by braiding together three monofilaments, the first of which extends the entire length of the leader line and is tapered, the second of which is less than the length of the leader line and substantially uniform in cross section, and the third of which is less than the length of the leader line and tapered;
   inserting the leader line into one end of the tube;
   gluing said leader line in said one end of the tube;
   inserting the fly line into the other end of the tube;
   stretching the tube to constrict same on the fly line; and
   gluing the fly line in said other end of the tube.

4. A method of constructing a junction leader for a fly line, comprising the steps of:
   braiding together a plurality of filaments on a mandrel to form a hollow tube having the ability to constrict upon elongation and open opposite ends large enough to receive the fly line;
   forming a leader line by braiding together three monofilaments, the first of which extends the entire length of the leader line and is tapered, the second of which is less than the length of the leader line and substantially uniform in cross section, and the third of which is less than the length of the leader line and tapered;
   inserting the leader line into one end of the hollow tube; and
   gluing said leader line in place in said one end of the tube.

* * * * *